US012736071B2

(12) United States Patent
Jonninen

(10) Patent No.: US 12,736,071 B2
(45) Date of Patent: Sep. 15, 2026

(54) METHOD AND SYSTEM FOR TRANSFERRING HYDRAULIC POWER BETWEEN A PUMP AND AN ACTUATOR

(71) Applicant: ALLU INNOVATION AND RESEARCH CENTER OY, Pennala (FI)

(72) Inventor: Markku Jonninen, Lohilahti (FI)

(73) Assignee: ALLU INNOVATION AND RESEARCH CENTER OY, Pennala (FI)

( * ) Notice: Subject to any disclaimer, the term of this patent is extended or adjusted under 35 U.S.C. 154(b) by 0 days.

(21) Appl. No.: 19/151,817

(22) PCT Filed: Dec. 12, 2023

(86) PCT No.: PCT/FI2023/050682
§ 371 (c)(1),
(2) Date: Jul. 29, 2025

(87) PCT Pub. No.: WO2024/165786
PCT Pub. Date: Aug. 15, 2024

(65) Prior Publication Data

US 2026/0226926 A1 Aug. 6, 2026

(30) Foreign Application Priority Data

Feb. 7, 2023 (FI) ...................................... 20235113

(51) Int. Cl.
*F15B 1/02* (2006.01)
*F15B 7/02* (2006.01)
*F15B 21/12* (2006.01)

(52) U.S. Cl.
CPC ................ *F15B 21/12* (2013.01); *F15B 1/02* (2013.01); *F15B 1/024* (2013.01); *F15B 7/02* (2013.01)

(58) Field of Classification Search
CPC .......... F15B 1/021; F15B 1/022; F15B 1/024; F15B 7/008; F15B 7/02; F15B 7/04; F15B 11/05; F15B 11/055; F15B 21/12
See application file for complete search history.

(56) References Cited

U.S. PATENT DOCUMENTS 3,758,237 A * 9/1973 Kachelhoffer .... A61M 5/14224 600/16
5,540,052 A 7/1996 Sieke
(Continued)

FOREIGN PATENT DOCUMENTS

| | | |
|---|---|---|
| CN | 104632786 A | 5/2015 |
| EP | 0359785 A1 | 3/1990 |
| WO | 8905408 | 6/1989 |

OTHER PUBLICATIONS

Written Opinion of the International Searching Authority for Application No. PCT/FI2023/050682 dated Mar. 22, 2024, 6 pages.
(Continued)

*Primary Examiner* — Michael Leslie
(74) *Attorney, Agent, or Firm* — Boone IP Law, PLLC

(57) ABSTRACT

In a method and a system for transmitting hydraulic power between a pump and an actuator, the actuator has an inlet and an outlet for hydraulic fluid, and in between and external to the actuator an actuator circuit, in which hydraulic fluid is circulated from the outlet to the inlet. A pulse pump generates pressure pulses at the desired frequency and hydraulic power is transmitted to the actuator with the help of pressure pulses by converting the pressure pulses into a flow going to the inlet. The return flows from the actuator are returned during the period between the pressure pulses to be used in the pressure pulse following each return flow, whereby an amount of hydraulic fluid corresponding to the volume of the pressure pulses moves across the cross-
(Continued)

Figure 1:
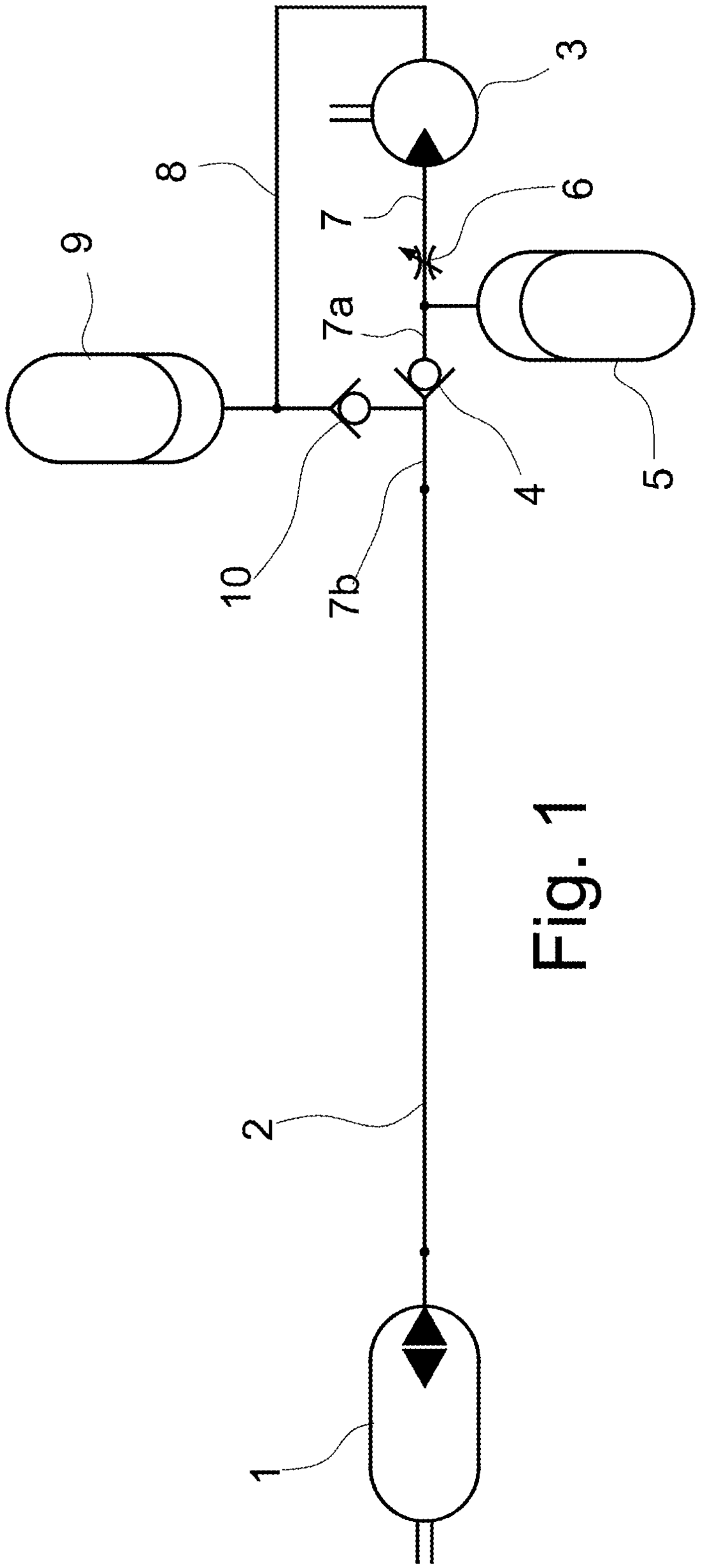

sectional flow area back and forth in the power transmission pipe or hose between the pulse pump and the actuator.

16 Claims, 3 Drawing Sheets

(56) References Cited

U.S. PATENT DOCUMENTS

| | | | | |
|---|---|---|---|---|
| 11,480,199 B2 * | 10/2022 | Woodard | ................ | F04B 23/02 |
| 2008/0256947 A1 * | 10/2008 | Walter | .................... | F15B 21/12 60/532 |

OTHER PUBLICATIONS

International Search Report of the PCT International Searching Authority for Application No. PCT/FI2023/050682 dated Mar. 22, 2024, 4 pages.

Finnish Search Report for Application No. 20235113 dated Aug. 10, 2023, issued by the Finnish Patent Office, 2 pages.

* cited by examiner

METHOD AND SYSTEM FOR TRANSFERRING HYDRAULIC POWER BETWEEN A PUMP AND AN ACTUATOR

The object of the invention is a method and system for transmitting hydraulic power between a pump and an actuator, the actuator having an inlet and an outlet for hydraulic fluid, having in between and external to the actuator an actuator circuit, in which hydraulic fluid is circulated by the pressure produced by the pump.

In conventional hydraulics, the aim is to keep the flow in the pipeline laminar to avoid losses. For example, if the pressure in the pipeline is in the range of 160-400 bar, then the recommended maximum velocity of the fluid in the pipe is 7 m/s. In conventional hydraulics, valve blocks are required to distribute the oil to different actuators, large oil tanks are needed, and large coolers are needed due to heat production caused by pipe resistances and flow regulation. There are usually several actuators per pump in the system, each of which having specific pressure and volume flow requirements that change continuously during operation. If even one actuator requires high pressure, the pump must produce it even if other actuators require low pressure. If several actuators require a large flow, and the pump output is not sufficient for them, the system regulates a limited rate of flow for all actuators. If the total power requested by the actuators exceeds the total power of the pump, the system distributes the available power according to what is set. In all, this adjustment causes losses and thus requires a real need to select a larger power device for using the pump.

The object of the invention is to provide a method and system operating on a principle that is essentially different from conventional hydraulics, whereby the total power requirement of the power device is minimized as each actuator circuit is operating completely independently without affecting the operation of other actuator circuits and the system in any other way than through the power requirement, the manufacturing costs of which remaining low compared with conventional systems, since the mentioned valve blocks, large oil tanks and large coolers are not needed. Also, fewer hydraulic pipes or hoses are needed than in conventional systems.

This object is achieved by the invention with the method disclosed in attached claim 1 and the system disclosed in claim 11. Advantageous embodiments of the invention are disclosed in the independent claims.

In the invention, an insight has been made to transmit hydraulic power to an actuator by means of pressure pulses and by converting the pressure pulses into a flow going into the actuator, whereby only an amount of hydraulic fluid corresponding to the volume of the pressure pulses moves back and forth in the power transmission pipe or hose.

Figure 2:
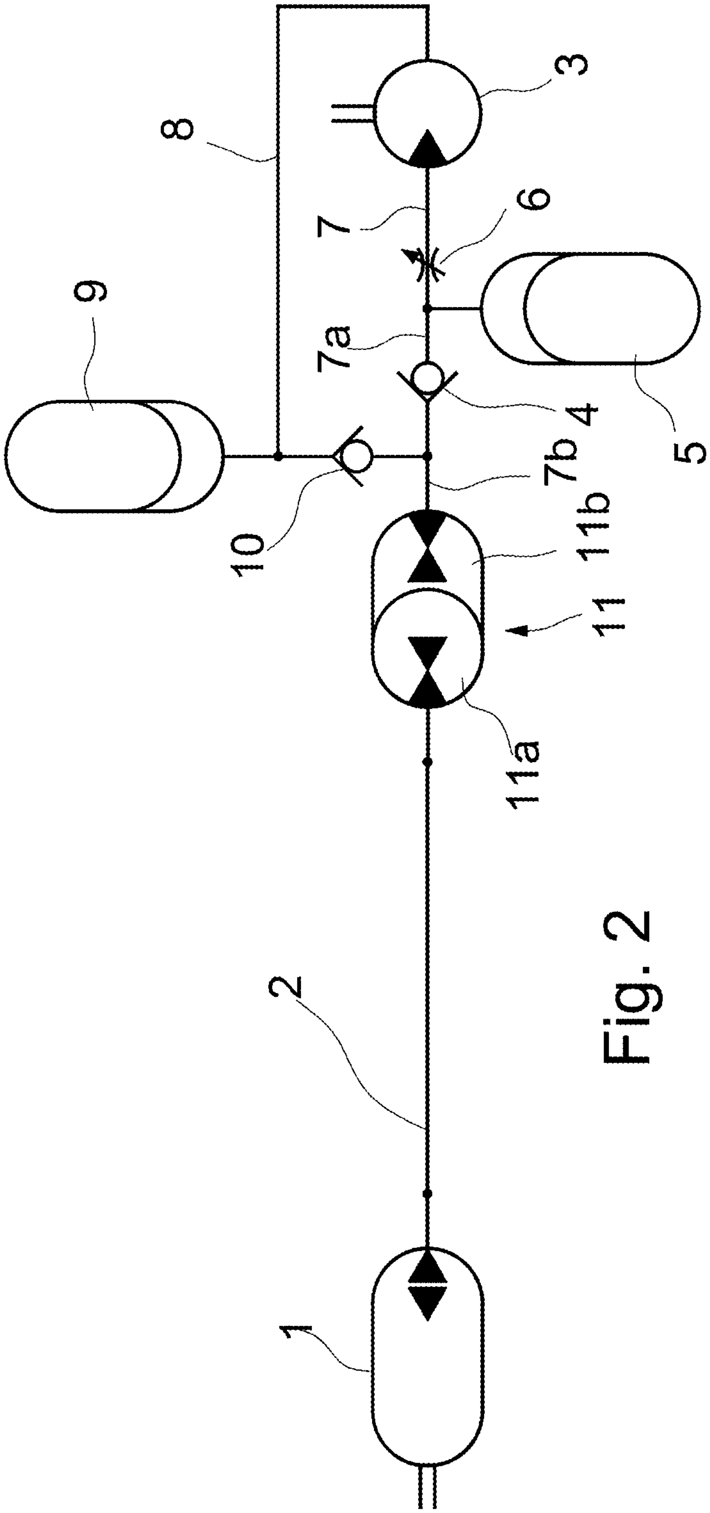
Figure 3:
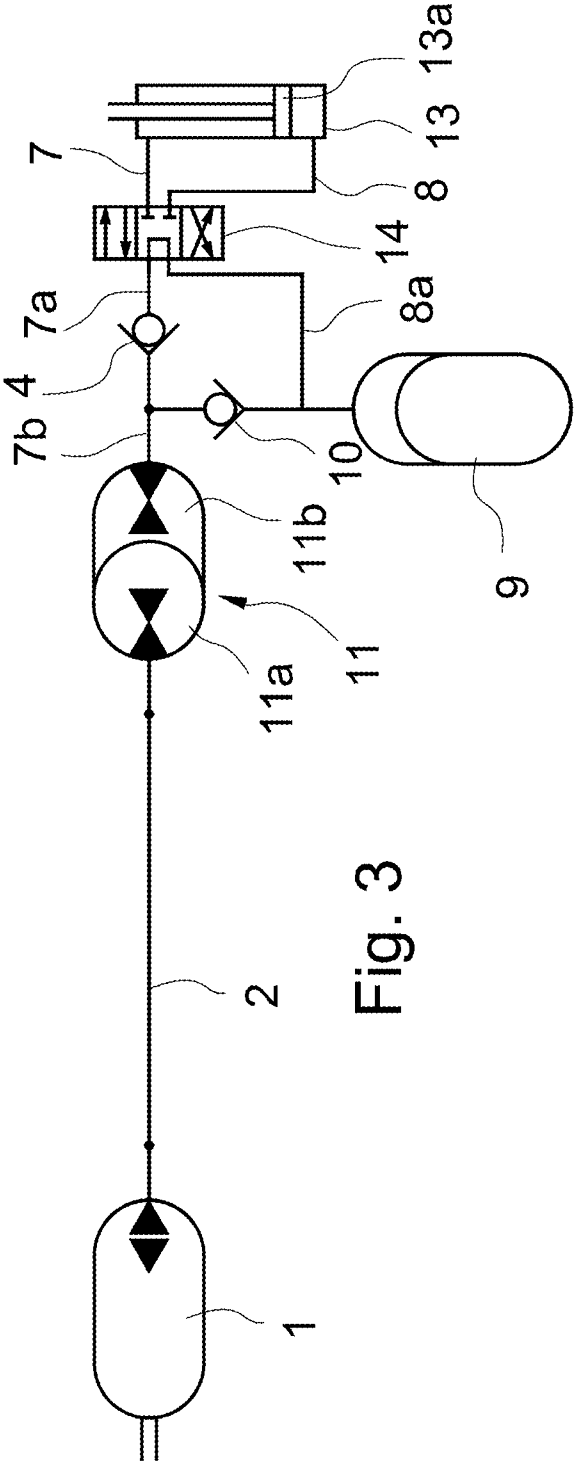

In the following, the invention is explained by way of examples with reference to the attached drawings, in which:

FIG. 1 shows the hydraulic diagram of a system according to an embodiment of the invention, in which the pressure pulses produced by pulse pump 1 are converted in the actuator circuit connected to actuator 3 into a flow going to inlet 7 of the actuator;

FIG. 2 shows otherwise the same as FIG. 1, but between pulse pump 1 and the actuator circuit connected to actuator 3, a power transmission unit 11 transmitting pressure pulses is connected, which also receives the return flows from the actuator circuit and thus separates the actuator circuit from power transmission pipe or hose 2; and FIG. 3 shows the hydraulic diagram of a system according to another embodiment of the invention, where actuator 13 is a piston cylinder device, the operation of which being controlled by directional valve 14. In addition, shown in the diagram is a power transmission unit 11 corresponding to that in FIG. 2.

In the method of the invention, pulse pump 1 is used to produce pressure pulses at the desired frequency. The hydraulic power is transmitted to actuator 3, 13 by means of the pressure pulses, by converting the pressure pulses into a flow going into inlet 7 of the actuator. The return flows from the actuator are returned during the period between pressure pulses to be used in the pressure pulse following each return flow. An amount of hydraulic fluid corresponding to the volume of the pressure pulses moves then across the cross-sectional flow area back and forth in the power transmission pipe or hose 2 located between pulse pump 1 and actuator 3, 13 and which can hereinafter also be called a pulse pipe.

The term pulse pump refers to any device or pulse generator that can produce pressure pulses into a fluid with a desired pulse frequency, desired stroke velocity and desired pulse size. A simple pulse pump is a piston moving back and forth in a cylindrical space. The stroke movement of the piston can be generated by a cam of a rotating shaft and the return movement by a spring. Several cams with the corresponding pistons can be attached to the same shaft, so that one pulse pump or pulse generator can use several actuators by feeding pressure pulses to several power transmission pipes or hoses.

In the systems according to FIGS. 1-3, pulse pump 1 is used to produce pressure pulses, which are used to generate a flow of hydraulic fluid to inlet 7 of actuator 3, 13. Pulse pump 1 generates repeated pressure pulses into the hydraulic fluid. By means of the pressure pulses and the components in the actuator circuit, the hydraulic fluid is made to move back and forth in the power transmission pipe or hose 2 between pulse pump 1 and actuator 3, 13. The pressure pulses transmitting power, and the return flows between them therefore travel in the same pipe or hose 2 in opposite directions one after the other.

From the outlet of actuator 8, the hydraulic fluid is returned to connecting channel **7*b* connected to inlet 7 of the actuator during return flow periods. In this connecting channel 7*b***, hydraulic fluid flows back and forth as a result of the alternation of pressure pulses and return flows.

In the embodiments of FIGS. 1 and 2, actuator 3 is a hydraulic motor, having an external actuator circuit 9, 10, **7*b*, 4, 5, 6 between outlet 8 and inlet 7, where hydraulic fluid that has passed through the motor is circulated by using the pressure of pressure pulses. This external actuator circuit is divided into return flow circuit 9, 10 and pressure circuit 4, 5, 6, which have a common connecting channel 7*b*, through which the actuator circuit is connected to the power transmission pipe or hose 2 (FIG. 1) or to the power transmission unit 11 (FIG. 2**), which will be explained below.

Outlet 8 of the actuator is connected to a pre-pressurized pressure accumulator 9 and, in addition, through non-return valve 10 to the inlet of non-return valve 4 connected to inlet 7 of the actuator.

Non-return valves 4 and 10 of the actuator circuit then ensure that the hydraulic fluid is circulated from outlet 8 of the actuator to its inlet 7, while a part of the actuator circuit's hydraulic fluid having the size of a pressure pulse moves in the connecting channel **7*b*** back and forth with the pulse frequency.

The embodiment of FIG. 3 differs from this in that the actuator is a piston cylinder device 13, to which the actuator circuit is connected via directional valve 14. Directional valve 14 can be used to control the direction of movement of piston 13*a*. In FIG. 3, piston 13*a* is connected to be immobile. The actuator circuit includes pressure circuit 4, 7*a* and return circuit 8*a*, 9, 10, as well as a connecting channel 7*b* common to these, with which the actuator circuit is connected to power transmission unit 11. Also here, non-return valves 4 and 10 of the actuator circuit ensure that the hydraulic fluid is circulated in the actuator circuit from outlet 8 of the actuator 13 to its inlet 7. Not shown in the diagram are chokes or other components that may be required for use. Pressure accumulator 9 must be able to accommodate the volume of fluid of the pressure pulse+the amount of fluid that is displaced by the piston rod. The entire system must be filled with hydraulic fluid at the initial stage. A small pre-pressure is charged to pressure accumulator 9, with which the volume of fluid of the pressure pulse is returned to connecting channel 7*b*. The hydraulic fluid can be an oil.

In the embodiments of FIGS. 1-3, hydraulic fluid returned from outlet 8 of actuator 3, 13 is led to the pre-pressurized pressure accumulator 9, which returns the hydraulic fluid through non-return valve 10 to connecting channel 7*b* connected to inlet 7 of the actuator when the pressure in it falls below the pre-pressure of pressure accumulator 9. A pre-pressure of 2-10 bar is typically maintained in pressure accumulator 9 to enhance the return flows and to prevent a negative pressure. Preventing negative pressure is important in order to have the hydraulic fluid or the gases dissolved in it not vaporized into bubbles. Since power transmission is based on the pressure of the pressure pulses and the size (volume) of each pressure pulse can be small (e.g. 0.1 liters), the compressibility of the hydraulic fluid must be as low as possible to avoid power losses. For this reason, it is advantageous to remove air from the hydraulic fluid by vacuum treatment before closing it to the power transmission circuit and/or the actuator circuit.

In the embodiments of FIGS. 1 and 2, pressure fluctuations of the pressure pulses are counterbalanced by a second pressure accumulator 5 connected to inlet 7 of actuator 3, the accumulator being able to hold at least the volume of the pressure pulse, i.e. the volume of hydraulic fluid that one pressure pulse moves across cross-sectional flow area. In addition, flow of hydraulic fluid to actuator 3 is counterbalanced by flow valve 6, which is connected to inlet 7 of actuator 3. In the embodiment of FIG. 3, the corresponding pressure accumulator 5 or the flow valve are not shown, because they are not essential.

In the embodiments of FIGS. 1-3, the periodic flow generated by pressure pulses is led to pressure circuit 7*a* connected to inlet 7 of actuator 3, 13 via a first non-return valve 4. The return flows from the actuator are led through a second non-return valve 10 to the inlet side of the first non-return valve 4. This enables the circulation of hydraulic fluid in the actuator circuit external to the actuator. Non-return valves can be replaced with synchronously controlled ON-OFF valves, of which one opens when the other one closes. The advantage of non-return valves is that they function automatically without the need for control.

In the embodiments of FIGS. 2 and 3, between the power transmission pipe or hose 2 and actuator 3, 13, there is a power transmission unit 11, the pressure pulses received by it being used to produce pressure pulses from the power transmission pipe or hose 2 into a separate actuator circuit. The return flows are also led to the power transmission unit 11. The power transmission unit 11 therefore receives the pressure pulses on the one hand and the return flow on the other hand. The power transmission unit 11 can be a double-sided diaphragm pressure accumulator, where a moving diaphragm separates two pressure spaces 11*a* and 11*b*. The power transmission pipe or hose 2 is connected to one pressure chamber 11*a* and the connecting channel 7*b* of the actuator circuit is connected to the second pressure chamber 11*b*. The diaphragm of the power transmission unit can be equipped with a return mechanism, which returns it to its initial state when pressure is lowering. The power transmission unit 11 can also be a two-circuit cylinder, in which a piston moves pushed by the pressure pulse and transmits hydraulic fluid on the other side of the piston into the actuator circuit and at the same time tensions a spring, which returns the piston and the hydraulic fluid back when the pressure pulse fades away. The pressure pulse entering the first pressure space 11*a* simultaneously also pressurizes the second pressure space 11*b* behind the flexible diaphragm or moving intermediate piston when the volumes in the pressure spaces are altered corresponding to the volume of the pressure pulse. An actuator circuit is connected to the second pressure chamber 11*b*, where a quantity of fluid equal to the pressure pulse and at the same pressure passes through non-return valve 4. That is, only the pressure and the volume change corresponding to the size of the pressure pulse are transmitted between the power transmission pipe or hose 2 and actuator 3, 13 in this power transmission unit 11. The return flow of the fluid occurs in the same way as the entry, but the diaphragm or piston moves in the other direction and transfers the fluid back to the power transmission pipe or hose 2.

If desired, power transmission unit 11 can also be used as a pressure-volume converter. This takes place, for example, so that the surface areas of the opposite ends of the piston moving between fluid spaces 11*a* and 11*b*, and the respective cylinder diameters are selected to be different.

The power transmission unit 11 therefore separates the actuator circuit from the power transmission pipe or hose 2. The pump-pulse tube-power transmission unit is its own circuit and the actuator circuit is its own circuit. Several circuits can still come between these: power transmission unit-pulse tube-power transmission unit, if power transmission over large distances is desired.

The reason for the separate fluid circuits is that it is then possible to make the pump-pulse tube-power transmission units (pulse circuits) as ready-made packages that are subsequently connected to the actuator circuits. The pulse circuit can be pre-filled with a fluid such as oil, which has been degassed to reduce compressibility. When the oil is in a closed circuit, it remains gas-free by not coming into contact with air. Another reason for separate fluid circuits is related to the propagation velocity of the pulse wave in the pipe. For water at a temperature of 20° C. it is 1482 m/s, for glycol a little lower and for oil approx. 1000 m/s. With some liquid metals, the velocity is even higher than with water. Regardless of the velocity, it limits the value of the pulse frequency, because the wave must have time to travel back and forth through the pipe, and in addition, filling of the fluid pulse takes time. For example, a wave traveling through a 10-m pipe at 1000 m/s requires 2×0.01 s=0.02 s time, which corresponds to a frequency of 50 Hz. A frequency faster than this can-not be used in a 10-m continuous pipe, whereby for longer distances, if there is a need for high frequencies, the pulse pipeline must be divided into suitable sections.

The frequency of the pressure pulses can vary greatly and in typical applications is in the range of 3-45 Hz, preferably 7-40 Hz. A frequency of 1 Hz is also possible, but at frequencies above 15 Hz or higher, the dynamic pressure of the pressure pulses and the smaller volume sizes of the pressure pulses can be utilized to a significant extent. The volume of each pressure pulse, i.e. the amount of fluid that has passed through the cross-section of the power transmission pipe or hose 2 during the period between the return flows, depends on the diameter of the pipeline, the length of the pipe, the maximum frequency determined by the propagation velocity of the pulse wave of the hydraulic fluid and the power requirement, and it is not possible to define an average value for it, because many variables are involved. In underwater drilling operations, large-diameter hoses and high working pressures of up to 5,000 bar are used to transmit hydraulic powers several orders of magnitude greater than in conventional machine and equipment manufacturing. For these high-pressure hydraulics, pulse hydraulics with the use of dynamic pressure as a one-hose system would fit well. The volume of the pulse in relation to the volume of the pulse tube is typically in the range ⅓ to 1/40 and preferably in the range ¼ to 1/30. In addition, in order to transmit power with the help of pressure pulses, the volume of the pulse must be larger than the volume of the compression of the fluid in the pulse tube under the pulse pressure. If the fluid is incompressible, smaller pulse sizes and higher frequencies are more advantageous and the dynamic pressure can be better utilized.

In addition, the actuator circuit must usually have a pressure filter in the circulation of the hydraulic fluid. The pressure filter can also be in the circuit of the pulse pump or pulse generator at the connection of the power transmission pipe or hose. Other known hydraulic circuit components can also be used, for example, to control actuators and adjust power transmission parameters. The actuator circuit of the hydraulic motor can also be equipped with a directional valve in order to change the direction of rotation of the motor. An actuator-specific cooler can also be added to the circuit if necessary.

The invention is not limited to the exemplary embodiments described above. For example, the connecting channel 7*b* can be replaced by a fluid space 11*b* of the power transmission unit 11, to which space the pressure side and the return side of the actuator circuit are separately connected via non-return valves. In this case, non-return valves 4 and 10 can be connected to the housing of the pressure accumulator or the head of the two-circuit cylinder, and fluid space 11*b* functions directly as a connecting channel between the circuit parts of the actuator circuit.

In the following, the theoretical background of the power transmission according to the invention will be examined in the light of numbers and examples.

In the invention, dynamic hydraulic pressure can be utilized by increasing the pressure pulse feed rate. In standard hydraulics, the velocity of the fluid was thus, in practice, not more than 7 m/s, at which the dynamic pressure of oil with a density of 850 kg/m$^3$ is 0.21 bar. If the pulse is fed into the pipe at a velocity of 100 m/s, the dynamic pressure is 42.5 bar. If we increase the velocity to 200 m/s, the share of dynamic pressure is 170 bar. This can be utilized in an energy transfer solution, because with a pressure wave propagation velocity of 1000 m/s, and high input velocity of the pulse, large powers can be transmitted. If the size of the pulse is, for example, 0.1 litres, the frequency is 20 Hz, the pulse feed velocity is 200 m/s, then the power transmitted is approximately 34 kW by means of dynamic pressure alone, if losses are not taken into account. Total power is the sum of the dynamic pressure and the pressure generated by the pulse pump.

The power produced by a conventional hydraulic pump is manageable, because the pressure depends on the load and the volume flow on the pump's rotational speed. In pulse hydraulics according to the invention, power can, in addition to the adjustments of frequency and pulse volume, be adjusted by adjustment of dynamic power by adjusting the velocity of the feed stroke.

If we compare conventional hydraulics and pulse hydraulics in power transmission, then the previously mentioned maximum velocity of laminar flow of 7 m/s in a pipe is a good starting point. If we take a ¾ " (inner diameter 16 mm) hydraulic pipe, then in conventional hydraulics at a velocity of 7 m/s, 84.4 liters/min of oil will flow through the pipe. If the oil pressure is 100 bar, power is transmitted through the pipe with a power of 14 kW. If pulse hydraulics is used, already at a frequency of 10 Hz with a pulse size of 0.11 liters and at the same normal hydraulic stroke velocity of 7 m/s, 22 kW of power can be transmitted (without taking losses into account in either case).

If the stroke velocity is increased above said 7 m/s, dynamic pressure will transmit more power, and if the frequency or pulse size is increased, the power also increases. The ratio of frequency and pulse size has limitations depending on the length of the pipe or hose, because the wave travels in the pipe at a limited velocity and the time of the pulse stroke must be taken into account. For example, the lead time for a 10-m pipe at a wave velocity of 1000 m/s is 0.01 s. The stroke velocity of the 0.11 liter pulse stroke of our test device was approx. 3 m/s. The measured du-ration of the pulse pressure from pressure increase to pressure decrease at the outlet end of the pulse tube was rise time 0.008 s+stabilization and fall time 0.024 s=0.0032 s, from which the minimum total time calculated from the beginning of the pulse to the beginning of a new pulse would be 0.0032+0.01+0.01=0.0232 s. This signifies a maximum frequency of approx. 43 Hz with these initial values. We tested our equipment with frequencies of up to 35 Hz, which was the maximum velocity of our equipment, and the pulses moved and transmitted power exactly as expected.

We have not been able to accurately measure the losses because the test equipment was designed to test the theory in practice.

Some additional information about the compressibility of hydraulic oil and its importance is given below. In normal hydraulics, compressibility of the oil hardly needs to be taken into account, if elasticity of the cylinders or the like is not taken into account. At normal pressure and a temperature of 20 degrees C., 9% of air is bound in the oil. This is the main reason for the 0.7% compression of the oil at a pressure of 100 bar. On the other hand, gases are dissolved from the oil and it will bubble if put under a negative pressure of 0.7 bar. If air is removed from the oil in pulse hydraulics by vacuum treatment and the power transmission system is filled with it so that the oil does not come into contact with air, better efficiency is obtained with pressure pulses having a small volume, when compression of the oil is reduced. The power transmission system itself would be a closed one if the actuator circuit is separated into a separate circuit. The actuator circuit can also be designed as a closed separate circuit.

The invention claimed is:

1. A method for transmitting hydraulic power between a pump and an actuator, the actuator having an inlet and an outlet for hydraulic fluid, and having in between and external to the actuator an actuator circuit, in which hydraulic fluid is circulated from the outlet to the inlet, the method comprising:

producing pressure pulses at a desired frequency with a pulse pump, transmitting hydraulic power to the actuator with the help of pressure pulses by converting the pressure pulses into a flow going to the inlet of the actuator, and returning the return flows from the actuator during a period between the pressure pulses to be used in the pressure pulse following each return flow, whereby an amount of hydraulic fluid corresponding to the volume of the pressure pulses moves across a cross-sectional flow area back and forth in a power transmission pipe or hose between the pulse pump and the actuator.

2. The method according to claim 1, wherein, from the outlet of the actuator, the hydraulic fluid is returned to a connecting channel connected to the inlet of the actuator during return flow periods, the hydraulic fluid flowing in the connecting channel back and forth as a result of the alternation of pressure pulses and return flows.

3. The method according to claim 1, wherein hydraulic fluid from the outlet of the actuator is led to a pre-pressurized pressure accumulator, which returns the hydraulic fluid to the connecting channel connected to the inlet of the actuator when the pressure therein falls below the pre-pressure of the pressure accumulator.

4. The method according to claim 3, wherein a pre-pressure of 2-15 bar is maintained in the pressure accumulator to enhance the return flows and to prevent negative pressure.

5. The method according to claim 1, wherein pressure fluctuations of the pressure pulses are counterbalanced by a pressure accumulator connected to the inlet of the actuator, the pressure accumulator being able to hold at least an amount of hydraulic fluid that one pressure pulse moves across the cross-sectional flow area.

6. The method according to claim 1, wherein a periodic flow generated by pressure pulses is led to the actuator, through a first non-return valve and the return flows from the actuator are led through a second non-return valve to an inlet side of the first non-return valve.

7. The method according to claim 1, wherein a flow of hydraulic fluid to the actuator is counterbalanced by a flow valve, which is connected to the inlet of the actuator.

8. The method according to claim 1, wherein air is removed from the hydraulic fluid before it is closed into the power transmission circuit and/or the actuator circuit.

9. The method according to claim 1, wherein, between the power transmission pipe or hose and the actuator there is a power transmission unit which separates the actuator circuit from the power transmission pipe or hose and the pressure pulses received by it being used to produce pressure pulses to the actuator circuit, and wherein the return flows are led into the power transmission unit.

10. The method according to claim 1, wherein a frequency of the pressure pulses is 3-45 Hz.

11. A system comprising a pump and an actuator and configured for transmitting hydraulic power between the pump and the actuator, the actuator having an inlet and an outlet for hydraulic fluid, and having in between and external to the actuator an actuator circuit, in which the hydraulic fluid is arranged to be circulated, wherein the pump is a pulse pump, which generates repeated pressure pulses into the hydraulic fluid, which moves back and forth in a power transmission pipe or hose between the pulse pump and the actuator, wherein the hydraulic fluid pressurized by the pressure pulses is arranged to flow into the inlet of the actuator, and wherein the outlet of the actuator is connected to a pre-pressurized pressure accumulator and, in addition, through a non-return valve or a controlled ON-OFF valve to the inlet of a non-return valve or an ON-OFF valve connected to the inlet of the actuator.

12. The system according to claim 11, wherein the pre-pressure of the pressure accumulator is arranged to promote the return flow of hydraulic fluid to the pulse pump during a period between pressure pulses.

13. The system according to claim 11, wherein a hydraulic circuit connected to the inlet of the actuator comprises a non-return valve or a controlled ON-OFF valve.

14. The system according to claim 13, wherein a pressure accumulator and/or a flow valve is connected between the non-return valve or the controlled ON-OFF valve and the actuator.

15. The system according to claim 11, wherein, between the power transmission pipe or hose and the actuator, there is a power transmission unit transmitting pressure pulses and separating the power transmission pipe or hose from the actuator circuit and receiving the pressure pulses on the one hand and the return flow on the other hand.

16. The system according to claim 15, wherein the power transmission unit is a double-sided diaphragm pressure accumulator or a two-circuit cylinder, in which a piston moves pushed by the pressure pulse and transmits hydraulic fluid on the other side of the piston into the actuator circuit and at the same time tensions a spring, which returns the piston and the hydraulic fluid back when the pressure pulse fade away.

* * * * *